United States Patent
Kanno

(10) Patent No.: US 11,171,517 B2
(45) Date of Patent: Nov. 9, 2021

(54) ELECTRODE UNIT, POWER TRANSMITTING DEVICE, POWER RECEIVING DEVICE, AND WIRELESS POWER TRANSMISSION SYSTEM

(71) Applicant: Panasonic Intellectual Property Management Co., Ltd., Osaka (JP)

(72) Inventor: Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/041,553

(22) PCT Filed: Mar. 28, 2019

(86) PCT No.: PCT/JP2019/013610
§ 371 (c)(1),
(2) Date: Sep. 25, 2020

(87) PCT Pub. No.: WO2019/189578
PCT Pub. Date: Oct. 3, 2019

(65) Prior Publication Data
US 2021/0119486 A1  Apr. 22, 2021

(30) Foreign Application Priority Data
Mar. 28, 2018  (JP) .............................. JP2018-062347

(51) Int. Cl.
*H02J 50/12* (2016.01)
*H02J 50/05* (2016.01)
(52) U.S. Cl.
CPC .............. *H02J 50/12* (2016.02); *H02J 50/05* (2016.02); *H02J 2310/48* (2020.01)
(58) Field of Classification Search
CPC ........ H02J 50/12; H02J 50/05; H02J 2310/48; H02J 7/00; Y02P 80/10
See application file for complete search history.

(56) References Cited

U.S. PATENT DOCUMENTS

2012/0038223 A1  2/2012 Harakawa
2014/0232185 A1*  8/2014 Sempel .................. H02J 50/05
307/11
(Continued)

FOREIGN PATENT DOCUMENTS

JP  2009-089520 A  4/2009
JP  2010-193692 A  9/2010
(Continued)

OTHER PUBLICATIONS

International Search Report for corresponding Application No. PCT/JP2019/013610, dated Jun. 25, 2019.

*Primary Examiner* — Jared Fureman
*Assistant Examiner* — Michael J Warmflash
(74) *Attorney, Agent, or Firm* — Renner, Otto, Boisselle & Sklar, LLP

(57) ABSTRACT

An electrode unit is used in a power transmitting device or a power receiving device in a wireless power transmission system of an electric field coupling method. The electrode unit includes a first electrode and a second electrode, which are a power transmitting electrode pair or a power receiving electrode pair, and a matching circuit to be connected between a power conversion circuit and the first and second electrodes in the power transmitting device or the power receiving device. The matching circuit includes a first inductor connected to the first electrode, a second inductor connected to the second electrode, and a first capacitor. The first capacitor is connected between a wire between the first electrode and the first inductor and a wire between the second electrode and the second inductor. The first inductor and the second inductor are magnetically coupled together with a negative coupling coefficient.

13 Claims, 10 Drawing Sheets

(56) References Cited

U.S. PATENT DOCUMENTS

| | | | |
|---|---|---|---|
| 2014/0253052 A1 | 9/2014 | Goma | |
| 2014/0354084 A1 | 12/2014 | Takahashi | |
| 2015/0270720 A1* | 9/2015 | Takahashi | H02J 50/12 |
| | | | 307/104 |
| 2016/0043575 A1* | 2/2016 | Ichikawa | H02J 50/12 |
| | | | 307/104 |
| 2017/0310162 A1* | 10/2017 | Matsumoto | H02J 50/05 |
| 2021/0075265 A1* | 3/2021 | Kanno | H02J 50/005 |

FOREIGN PATENT DOCUMENTS

| | | |
|---|---|---|
| JP | 2013-243788 A | 12/2013 |
| JP | 5541422 B2 | 5/2014 |
| JP | 2016-174522 A | 9/2016 |
| JP | 2016-189686 A | 11/2016 |
| JP | 2017-070055 A | 4/2017 |
| WO | 2013/140665 A1 | 9/2013 |
| WO | 2015/002126 A1 | 1/2015 |

* cited by examiner

ELECTRODE UNIT, POWER TRANSMITTING DEVICE, POWER RECEIVING DEVICE, AND WIRELESS POWER TRANSMISSION SYSTEM

TECHNICAL FIELD

The present disclosure relates to an electrode unit, a power transmitting device, a power receiving device and a wireless power transmission system.

BACKGROUND ART

In recent years, wireless power transmission techniques have been developed for transmitting electric power wirelessly, i.e., in a contactless manner, to a device with mobility such as a mobile telephone or an electric car. The wireless power transmission techniques include those of the electromagnetic induction method and those of the electric field coupling method. In a wireless power transmission system of the electric field coupling method, AC power is transmitted wirelessly from a pair of power transmitting electrodes to a pair of power receiving electrodes, with the pair of power transmitting electrodes and the pair of power receiving electrodes opposing each other. Patent Document No. 1 and Patent Document No. 2 disclose an example of such a wireless power transmission system of the electric field coupling method.

CITATION LIST

Patent Literature

Patent Document No. 1: International Publication WO2013/140665 pamphlet
Patent Document No. 2: Japanese Laid-Open Patent Publication No. 2010-193692

SUMMARY OF INVENTION

Technical Problem

The present disclosure provides a technique for improving the power transmission efficiency of a wireless power transmission system of an electric field coupling method.

Solution to Problem

An electrode unit according to one aspect of the present disclosure is used in a power transmitting device or a power receiving device in a wireless power transmission system of an electric field coupling method. The electrode unit includes: a first electrode and a second electrode, which are a power transmitting electrode pair or a power receiving electrode pair; and a matching circuit to be connected between a power conversion circuit and the first and second electrodes in the power transmitting device or the power receiving device. The power conversion circuit includes a first terminal and a second terminal, and converts electric power output from a power source into AC power for transmission and outputs the converted power from the first and second terminals, or converts AC power input to the first and second terminals into another form of electric power to be used by a load and outputs the converted power. The matching circuit includes: a first inductor connected to the first electrode; a second inductor connected to the second electrode; and a first capacitor connected between a wire between the first electrode and the first inductor and a wire between the second electrode and the second inductor. On an opposite side from the first electrode, the first inductor is to be directly or indirectly connected to the first terminal of the power conversion circuit. On an opposite side from the second electrode, the second inductor is to be directly or indirectly connected to the second terminal of the power conversion circuit.

The general and specific aspects of the present disclosure may be implemented using a device, a system, a method, an integrated circuit, a computer program or a storage medium, or any combination of systems, devices, methods, integrated circuits, computer programs and storage media.

Advantageous Effects of Invention

The technique of the present disclosure improves the power transmission efficiency of a wireless power transmission system of the electric field coupling method.

DESCRIPTION OF EMBODIMENTS

Findings Forming Basis for Present Disclosure

Findings forming the basis tor the present disclosure will be described before describing embodiments of the present disclosure.

Figure 1:
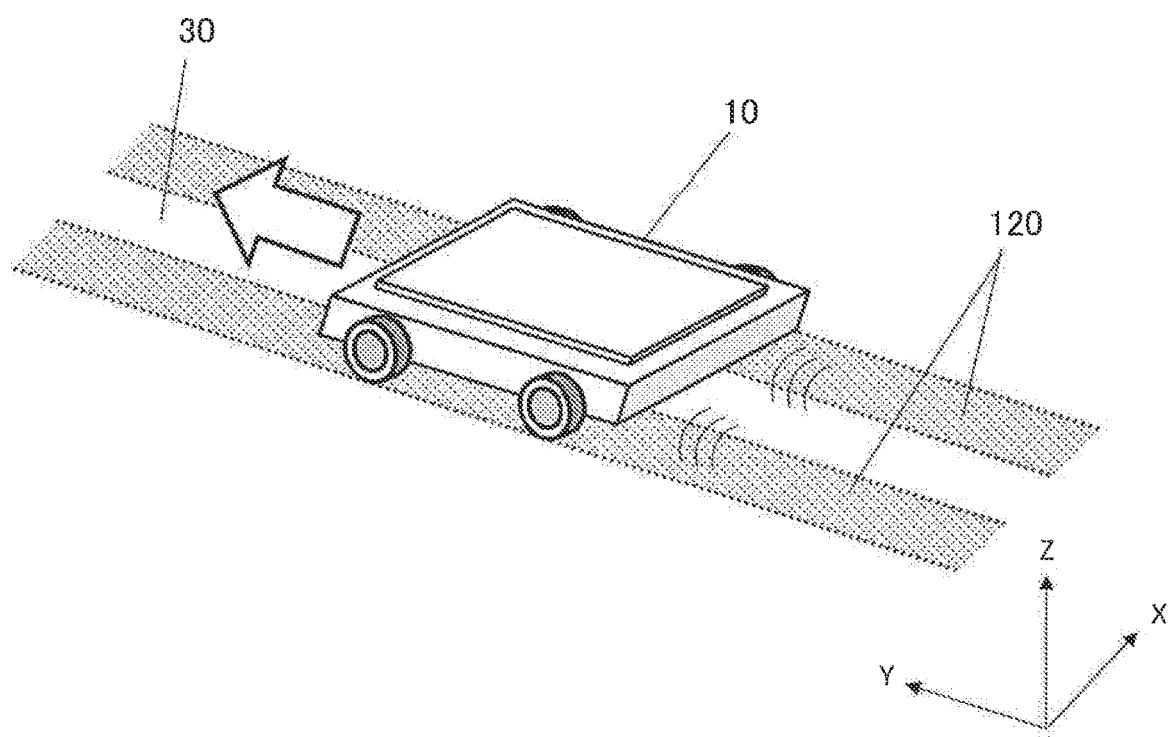
FIG. 1 is a diagram schematically showing an example of a wireless power transmission system of the electric field coupling method.

FIG. 1 is a diagram schematically showing an example of a wireless power transmission system of the electric field coupling method. The "electric field coupling method" refers to a method of power transmission in which electric power is wirelessly transmitted from a group of power transmitting electrodes including a plurality of power transmitting electrodes to a group of power receiving electrodes including a plurality of power receiving electrodes through electric field coupling (hereinafter referred to also as capacitive coupling) between the group of power transmitting electrodes and the group of power receiving electrodes. For the sake of simplicity, an example where the group of power transmitting electrodes and the group of power receiving electrodes are each composed of a pair of two electrodes. The group of power transmitting electrodes and the group of power receiving electrodes may each include three or more electrodes. In that case, AC voltages of opposite phases are applied to any two electrodes adjacent to each other in each of the group of power transmitting electrodes and the group of power receiving electrodes.

The wireless power transmission system shown in FIG. 1 is a system for wirelessly transmitting electric power to a vehicle 10, which is an automated guided vehicle (AGV). The vehicle 10 may be used for transporting articles in a factory or a warehouse, for example. In this system, a pair of flat plate-shaped power transmitting electrodes 120 are arranged on a floor surface 30. The vehicle 10 includes a pair of power receiving electrodes opposing the pair of power transmitting electrodes 120 when electric power is transmitted. The vehicle 10 uses the pair of power receiving electrodes to receive AC power transmitted from the pair of power transmitting electrodes 120. The received electric power is supplied to a load of the vehicle 10, such as a motor, a secondary battery or a capacitor for storing electricity. Thus, the vehicle 10 is driven or charged.

FIG. 1 shows XYZ coordinates representing the X, Y and Z directions that are orthogonal to each other. The illustrated XYZ coordinates will be used in the following description. The Y direction denotes the direction in which the power transmitting electrodes 120 extend, the Z direction denotes the direction that is perpendicular to the surface of the power transmitting electrodes 120, and the X direction denotes the direction perpendicular to the Y direction and the Z direction, i.e., the width direction of the power transmitting electrodes 120. Note that the directions of structures shown in the figures of the present application are determined in view of the ease of understanding of the description herein, and they do not in any way limit directions to be used when actually carrying out any embodiment of the present disclosure. Also, the shape and size of the whole or part of any structure illustrated in the figures do not limit the actual shape and size thereof.

Figure 2:
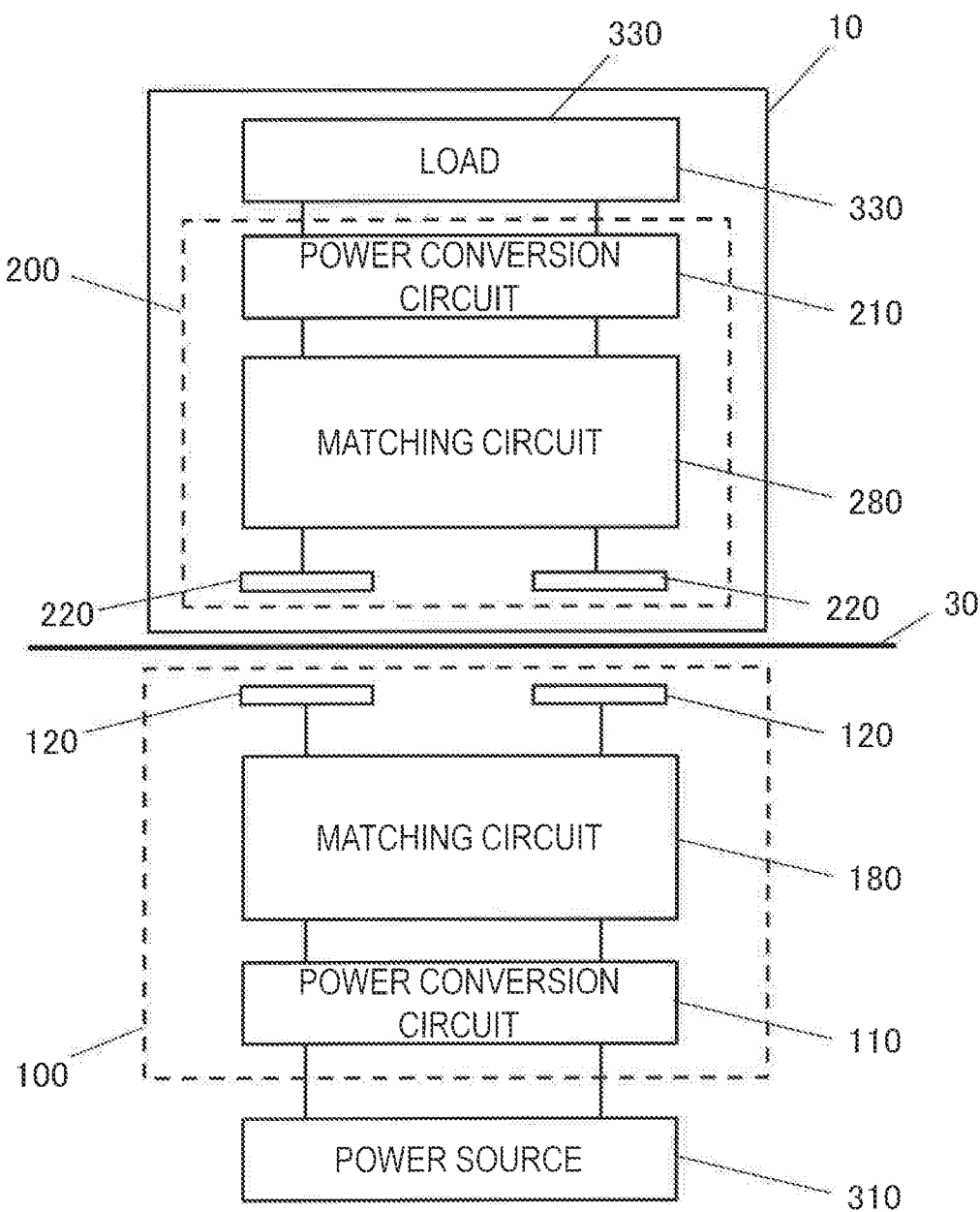
FIG. 2 is a diagram showing a general configuration of the wireless power transmission system shown in FIG. 1.

FIG. 2 is a diagram showing a general configuration of the wireless power transmission system shown in FIG. 1. The wireless power transmission system includes a power transmitting device 100 and the vehicle 10.

The power transmitting device 100 includes the pair of power transmitting electrodes 120, a matching circuit 180, and the power conversion circuit 110. The power conversion circuit 110 converts the electric power output from the power source 310 into AC power for transmission, and outputs the converted power. The power conversion circuit 110 may include an AC output circuit such as an inverter circuit, for example. The power conversion circuit 110 converts the DC power supplied from the power source 310 into AC power, and outputs the converted power to the pair of power transmitting electrodes 120. The power source 310 may be an AC power source. In that case, the power conversion circuit 110 converts the AC power supplied from the power source 310 into AC power of a different frequency or voltage, and outputs the converted power to the pair of power transmitting electrodes 120. The matching circuit 180 is connected between the power conversion circuit 110 and the pair of power transmitting electrodes 120. The matching circuit 180 improves the degree of impedance match between the power conversion circuit 110 and the pair of power transmitting electrodes 120.

The vehicle 10 includes a power receiving device 200 and a load 330. The power receiving device 200 includes a pair of power receiving electrodes 220, a matching circuit 280, and a power conversion circuit 210. The power conversion circuit 210 converts the AC power received by the pair of power receiving electrodes 220 into electric power as requested by the load 330, and supplies the converted power to the load 330. The power conversion circuit 210 may include various circuits such as a rectifier circuit or a frequency conversion circuit, for example. The matching circuit 280 for reducing impedance mismatch is inserted between a power receiving electrodes 220 and the power conversion circuit 210.

The load 330 is a component that consumes or stores electric power, such as a motor, a capacitor for storing electricity or a secondary battery, for example. Electric power is wirelessly transferred between the pair of power transmitting electrodes 120 and the pair of power receiving electrodes 220, while they oppose each other, through electric field coupling therebetween. The transferred electric power is supplied to the load 330.

In this example, the power transmitting electrodes 120 are arranged generally parallel to the floor surface 30. The power transmitting electrodes 120 may be arranged so as to cross the floor surface 30. For example, when installed on a wall, the power transmitting electrodes 120 may be arranged substantially vertical to the floor surface 30. The power receiving electrodes 220 of the vehicle 10 may also be arranged so as to cross the floor surface so that the power receiving electrodes 220 oppose the power transmitting electrodes 120. Thus, the arrangement of the power receiving electrodes 220 is determined according to the arrangement of the power transmitting electrodes 120.

Figure 3:
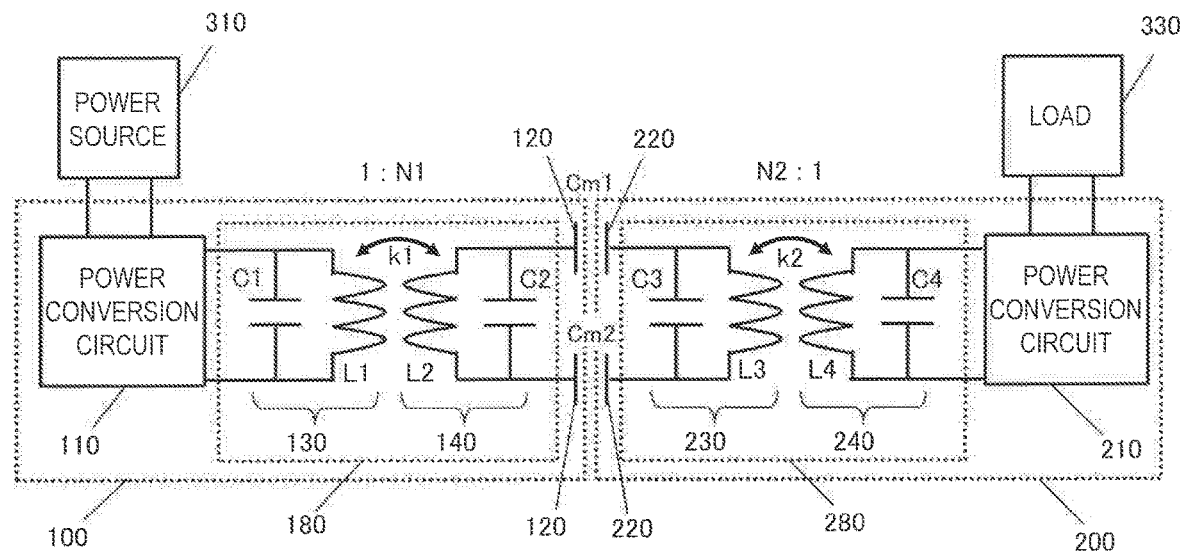
FIG. 3 is a diagram showing a system configuration according to a first comparative example.

FIG. 3 is a diagram showing an example of a circuit configuration of the matching circuits 180 and 280. This circuit configuration is similar to the configuration disclosed in Patent Document No. 2.

The matching circuit 180 of the power transmitting device 100 includes a first parallel resonance circuit 130 and a second parallel resonance circuit 140. The first parallel resonance circuit 130 is connected to the power conversion circuit 110. The second parallel resonance circuit 140 is arranged between the first parallel resonance circuit 130 and the pair of power transmitting electrodes 120. The second parallel resonance circuit 140 is connected to the pair of power transmitting electrodes 120, and magnetically couples to the first parallel resonance circuit 130. The first parallel resonance circuit 130 has a configuration in which the coil L1 and the capacitor C1 are connected in parallel to each other. The second parallel resonance circuit 140 has a configuration in which the coil L2 and the capacitor C2 are connected in parallel to each other. The coil L1 and the coil L2 together form a transformer with a coupling coefficient k1. The turns ratio (1:N1) between the coil L1 and the coil L2 is set to a value such that a desired transformation ratio is realized.

The matching circuit 280 of the power receiving device 200 includes a third parallel resonance circuit 230 and a fourth parallel resonance circuit 240. The third parallel resonance circuit 230 is connected to the pair of power receiving electrodes 220. The fourth parallel resonance circuit 240 is arranged between the third parallel resonance circuit 230 and the power conversion circuit 210, and magnetically couples to the third parallel resonance circuit 230. The power conversion circuit 210 converts the AC power output from the fourth parallel resonance circuit 240 into DC power, and supplies the converted power to the load 330. The third parallel resonance circuit 230 has a configuration in which the coil L3 and the capacitor C3 are connected in parallel to each other. The fourth parallel resonance circuit 240 has a configuration in which the coil L4 and the capacitor C4 are connected in parallel to each other. The coil L3 and the coil L4 together form a transformer with a coupling coefficient k2. The turns ratio (N2:1) between the coil L3 and the coil L4 is set to a value such that a desired transformation ratio is realized.

The four parallel resonance circuits 130, 140, 230 and 240 have an equal resonance frequency, and the power conversion circuit 110 outputs AC power of a frequency equal to the resonance frequency thereof. Thus, the parallel resonance circuits 130, 140, 230 and 240 are in a resonant state when electric power is transferred.

The power transmitting electrodes 120 and the power receiving electrodes 220 are arranged so as to oppose each other while being close to each other. A dielectric having a high relative dielectric constant may be provided between the power transmitting electrodes 120 and the power receiving electrodes 220. With such a configuration, the capacitances Cm1 and Cm2 between the two power transmitting electrodes 120 and the two power receiving electrodes 220 can be made as high as possible. The reason why electric power is transferred while the capacitances Cm1 and Cm2 are made as high as possible is to make it possible to stably transfer electric power even if the relative position between the power transmitting electrodes 120 and the power receiving electrodes 220 changes. When the capacitances Cm1 and Cm2 are very high, the impedance of the electrodes 120 and 220 is far smaller than the impedance of the parallel resonance circuits 230 and 240 at resonance. As a result, it is possible to reduce the fluctuation of the voltage given to the load 330 even if the relative position between the power transmitting electrodes 120 and the power receiving electrodes 220 changes and the capacitances Cm1 and Cm2 fluctuate.

Thus, with the configuration shown in FIG. 3, there is a need to increase the capacitances Cm1 and Cm2 in order to reduce the impedance of the electrodes 120 and 220. Therefore, the distance between electrodes is decreased as much as possible, and a dielectric having a high dielectric constant is arranged between electrodes.

However, with such a configuration, there is a limitation on the relative positional relationship between the power transmitting device 100 and the power receiving device 200. In order to realize applicability to a wide variety of applications, it is desired that it is possible to maintain a high transmission efficiency even when the gap between electrodes is left as being a gap rather than providing a dielectric therebetween. It is also desired that it is possible to maintain a high transmission efficiency even when the distance between the electrodes 120 and 220 is relatively long (e.g., 5 mm to several tens mm).

Figure 4:
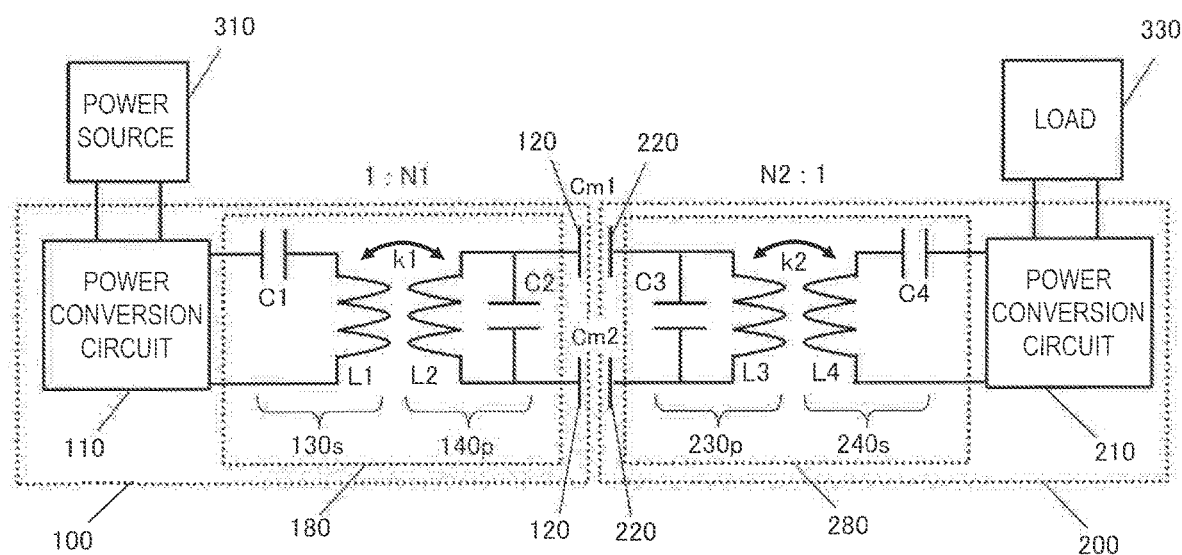
FIG. 4 is a diagram showing a system configuration according to a second comparative example.

FIG. 4 shows an example of a circuit configuration that can solve the problem described above. In the example of FIG. 4, each of the matching circuits 180 and 280 includes a combination of a series resonance circuit and a parallel resonance circuit. The matching circuit 180 of the power transmitting device 100 includes the series resonance circuit 130s and the parallel resonance circuit 140p. The matching circuit 280 of the power receiving device 200 includes the parallel resonance circuit 230p and the series resonance circuit 240s. With such a configuration, it is easy to realize impedance match even when the capacitance between the electrodes 120 and 220 is small.

An advantage of the configuration of FIG. 4 will be described with reference to FIG. 5A and FIG. 5B.

Figure 5A:
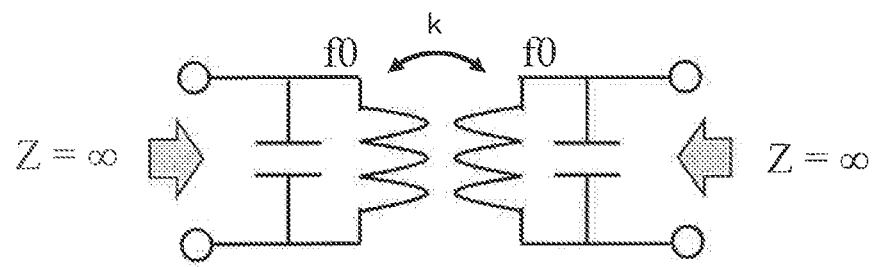
FIG. 5A is a diagram showing a configuration of a resonator pair in the power transmitting device shown in FIG. 3.

FIG. 5A shows a configuration of a resonator pair in the power transmitting device 100 shown in FIG. 3. FIG. 5B shows a configuration of a resonator pair in the power transmitting device 100 shown in FIG. 4.

With the configuration shown in FIG. 5A, the resonator on the power source side (the left side in the figure) and the resonator of the electrode side (the right side in the figure) are both a parallel resonance circuit. Therefore, the impedance at resonance, i.e., when the transmission frequency f1 coincides with the resonance frequency f0, is close to infinity for both resonators. Therefore, it is difficult to match the low output impedance on the power source output terminal side and the high input impedance on the electrode input section side with each other.

Figure 5B:
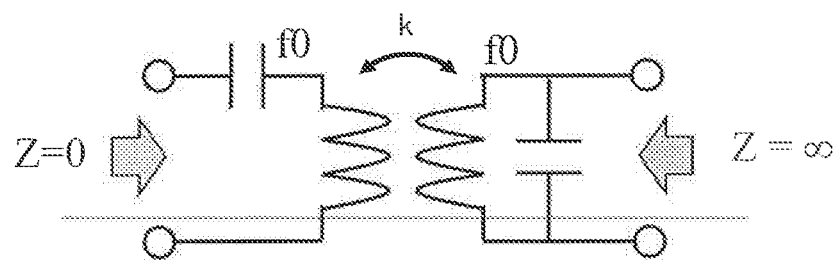
FIG. 5B is a diagram showing a configuration of a resonator pair in the power transmitting device shown in FIG. 4.

On the other hand, with the configuration shown in FIG. 5B, since the resonance circuit on the power source side is a series resonance circuit, it is easy to match the low output impedance on the power source output terminal side and the high input impedance on the electrode input section side with each other. A series resonance circuit, whose impedance at resonance is close to zero (0), is suitable for matching with an external circuit of a low input/output impedance. On the other hand, a parallel resonance circuit, whose impedance at resonance is close to infinity, is suitable for matching with an external circuit of a high input/output impedance. Therefore, as with the configuration shown in FIG. 5B, it is possible to easily realize an impedance match by arranging a series resonance circuit on the side of the power source output terminal of a low output impedance, and arranging a parallel resonance circuit on the side of the electrode input section of a high input impedance.

The above is not limited to the power transmitting device 100, but similarly holds true for the power receiving device 200. That is, it is possible to easily realize an impedance match in the power receiving device 200 by arranging a parallel resonance circuit on the side closer to the power receiving electrodes 220 and arranging a series resonance circuit on the side closer to the load 330 as shown in FIG. 4.

Thus, with the configuration shown in FIG. 4, it is possible to enhance the degree of impedance match and to improve the power transmission efficiency. However, with further in-depth study, the present inventor arrived at the configuration of a matching circuit with which it is possible to further improve the power transmission efficiency.

Figure 6:
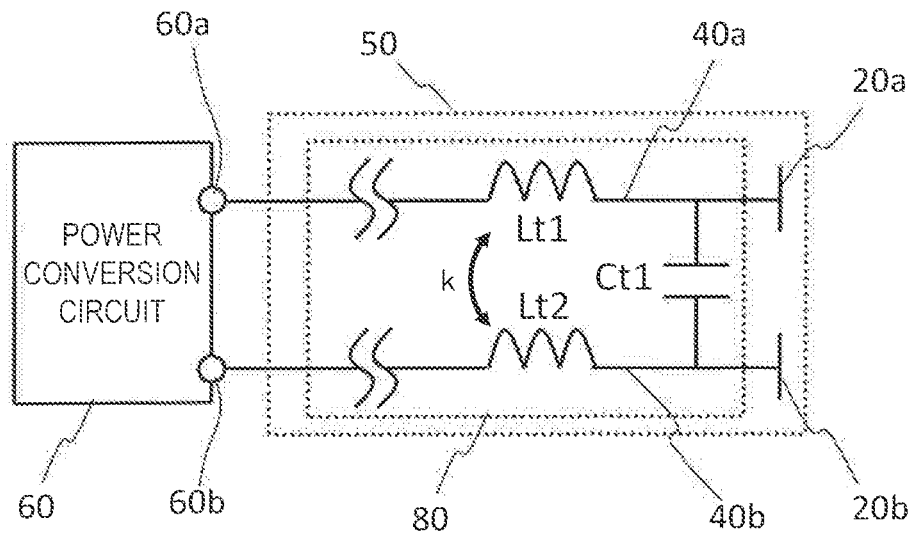
FIG. 6 is a schematic diagram of an electrode unit according to an exemplary embodiment of the present disclosure.

FIG. 6 is a diagram showing an example of a general configuration of an electrode unit including such a matching circuit and two electrodes. This electrode unit 50 is used in a power transmitting device or a power receiving device in a wireless power transmission system of the electric field coupling method. The electrode unit 50 includes a first electrode 20a and a second electrode 20b, which are a power transmitting electrode pair or a power receiving electrode pair, and a matching circuit 80.

When electric power is transferred, voltages of opposite phases are applied to the electrodes 20a and 20b. The term "opposite phases" in the present specification means that the phase difference is greater than 90 degrees and less than 270 degrees. Typically, AC voltages whose phases are different from each other by about 180 degrees are applied to the electrodes 20a and 20b. The matching circuit 80 is to be connected between a power conversion circuit 60 and the electrodes 20a and 20b in a power transmitting device or a power receiving device.

The power conversion circuit 60 includes a first terminal 60a and a second terminal 60b. Where the power conversion circuit 60 is installed in a power transmitting device, the power conversion circuit 60 converts the electric power output from the power source into AC power for transmission, and outputs the converted power through the first terminal 60a and the second terminal 60b. Where the power conversion circuit 60 is installed in a power receiving device, the power conversion circuit 60 converts the AC power input to the first terminal 60a and the second terminal 60b into another form of electric power that is used by the load to output the converted power.

The matching circuit 80 includes a first inductor Lt1 connected to the first electrode 20a, a second inductor Lt2 connected to the second electrode 20b, and a first capacitor Ct1. The first capacitor Ct1 is connected between a wire 40a between the first electrode 20a and the first inductor Lt1 and a wire 40b between the second electrode 20b and the second inductor Lt2. The first capacitor Ct1 may be referred to also as a "parallel capacitive element". At the terminal that is on the opposite side from the terminal connected to the first electrode 20a, the first inductor Lt1 is to be directly or indirectly connected to the first terminal 60a of the power conversion circuit 60. At the terminal that is on the opposite side from the terminal connected to the second electrode 20b, the second inductor Lt2 is to be directly or indirectly connected to the second terminal 60b of the power conversion circuit 60.

Between the power conversion circuit 60 and the inductor Lt1 or Lt2, a circuit element such as another inductor, a capacitor, a filter circuit or a transformer may be inserted. In that case, the inductor Lt1 or Lt2 is indirectly connected to the terminal 60a or 60b of the power conversion circuit 60.

By providing the electrode unit 50 having the configuration described above in at least one of the power transmitting device and the power receiving device, it is possible to further improve the match and it is possible to further improve the power transmission efficiency as will be later described in detail.

The coupling coefficient k between the first inductor Lt1 and the second inductor Lt2 may be set to a value that satisfies −1<k<0, for example. As a result, the first inductor Lt1 and the second inductor Lt2 may function as a common mode choke filter. Thus, it is possible to reduce the intensity of common mode noise, which may cause unnecessary radiation to be output toward the electrode side. In this case, the resonator formed of the first inductor Lt1, the second inductor Lt2 and the first capacitor Ct1 may be referred to as a "common mode choke resonator".

A reference sign such as Lt1 and Lt2 representing an inductor will be used, in the following description, also as a sign representing the inductance value of the inductor. Similarly, a reference sign such as Ct1 representing a capacitor will be used also as a sign representing the capacitance value of the capacitor.

In the matching circuit 80 according to an embodiment of the present disclosure, the inductors Lt1 and Lt2 are magnetically coupled with the coupling coefficient k, and as a result, the leakage inductance generated in the pair of inductors Lt1 and Lt2 and the capacitance of the capacitor Ct1 together form a resonance loop. The resonance frequency f0, the inductances Lt1 and Lt2 and the capacitance Ct1 of the common mode choke resonator satisfy the relationship of Expression 1 below.

$$f0 = \frac{1}{2\pi\sqrt{(Lt1 + Lt2)Ct1}}$$ [Expression 1]

In actual design, strictly speaking, there may be a difference between the value of the expression above and the actual resonance frequency because of the influence of circuits to be added on the side of the power conversion circuit 60 and circuits to be added on the side of the electrodes 20a and 20b and the input/output impedance. Even in that case, the design is made such that the resonance frequency generally falls within an error range of 50% of the value of the expression above. The resonance frequency f0 of the common mode choke resonator and the transmission frequency f1 are set to be substantially equal to each other. Therefore, the frequency f1 of the AC power to be transmitted may be set to a value within a range of 0.5 to 1.5 times the value of f0 shown in Expression 1, for example.

Next, in the common mode choke resonator, the inductances Lt1 and Lt2 are set to values that are substantially equal to each other, for example. Assuming that the range of manufacture variation of inductors in general is within ±20%, the difference between the inductances Lt1 and Lt2 is set within 40%, for example. In other words, the difference between Lt1 and Lt2 is smaller than 0.4 times the average value of Lt1 and Lt2. More preferably, the difference between the inductances Lt1 and Lt2 is set within ±10%. In this case, the difference between Lt1 and Lt2 is smaller than 0.1 times the average value of Lt1 and Lt2. With the wireless power transmission system according to an embodiment of the present disclosure, with a limitation on the increase of the electrode area, it is preferred that the voltage phase difference between the electrode 20a and the electrode 20b, which are connected to the output terminal of the common mode choke resonator, is kept at 180 degrees, in order to transfer a large amount of electric power with a small area. Keeping the inductances Lt1 and Lt2 equal to each other maintains of circuit symmetry in the wireless power transmission system of an embodiment of the present disclosure, resulting in more preferable effects.

The value of the capacitance value Ct1 of the first capacitor Ct1 is determined based on the relationship between Lt1 and Lt2 as described above.

When electric power is transferred, where V0 is the effective value of the voltage of the AC power output from the power conversion circuit 60 or the AC power input to the power conversion circuit 60, and V1 is the effective value of the voltage between the first electrode 20a and the second electrode 20b, V1/V0>2.14 is satisfied, for example. For example, the lower limit value 2.14 is the ratio that is obtained where the DC energy obtained by smoothing the AC energy supplied from a 200-V AC power source is used as the power source and where the voltage difference between the lines is 600 V, which is the upper limit of the AC Low Voltage standard. As another example, V1/V0>4.28 may be satisfied based on the ratio that is obtained where the DC energy obtained by smoothing the AC energy supplied from a 100-V AC power source is used as the power source and where the voltage difference between the lines is 600 V, which is the upper limit of the AC Low Voltage standard. As another example, V1/V0<50 may be satisfied based on the ratio that is obtained where the DC energy obtained by smoothing the AC energy supplied from a 100-V AC power source is used as the power source and where the voltage difference between the lines is 7000 V, which is the upper limit of the AC High Voltage standard. As another example, V1/V0<25 may be satisfied based on the ratio that is obtained where the DC energy obtained by smoothing the AC energy supplied from a 200-V AC power source is used as the power source and where the voltage difference between the lines is 7000 V, which is the upper limit of the AC High Voltage standard. Needless to say, even when the voltage difference between the lines takes a value greater than or equal to 7000 V, which corresponds to the special high voltage reference, if safety measures are taken, there is no limitation on the upper limit of the range V1/V0 in the design of an embodiment of the present disclosure. When the matching circuit 80 is provided in power transmitting device, the matching circuit 80 functions as a step-up circuit with a step-up ratio of V1/V2. When the matching circuit 80 is provided in the power receiving device, the matching circuit 80 functions as a step-down circuit with a step-down ratio of V0/V1.

The matching circuit 80 may include circuit elements other than those shown in FIG. 6. Other examples of the matching circuit 80 will be described with reference to FIG. 7A to FIG. 7F.

Figure 7A:
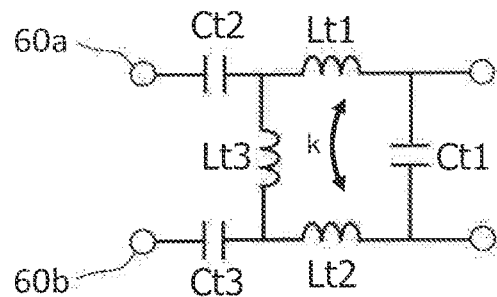
FIG. 7A is a diagram showing a first variation of a matching circuit.

FIG. 7A is a diagram showing a first variation of the matching circuit 80. The matching circuit 80 further includes a second capacitor Ct2, a third capacitor Ct3 and a third inductor Lt3. The second capacitor Ct2 is connected between the first inductor Lt1 and the first terminal 60a as a series circuit element. The third capacitor Ct3 is connected between the second inductor Lt2 and the second terminal 60b as a series circuit element. The third inductor Lt3 is connected, as a parallel circuit element, between a wire between the first inductor Lt1 and the second capacitor Ct2 and a wire between the second inductor Lt2 and the third capacitor Ct3. It can be said that this configuration is obtained by adding a high-pass filter having a symmetrical circuit configuration to the configuration shown in FIG. 6. With such a configuration, the number of filters is increased and the match is improved, and it is possible to further improve the transmission efficiency.

Figure 7B:
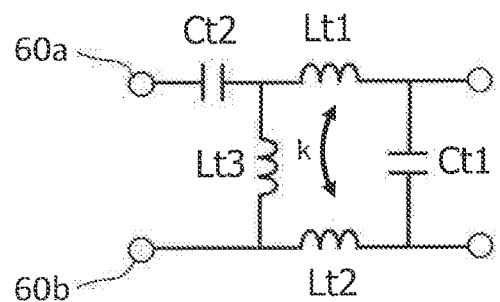
FIG. 7B is a diagram showing a second variation of a matching circuit.

FIG. 7B is a diagram showing a second variation of the matching circuit 80. The matching circuit 80 further includes the second capacitor Ct2 and the third inductor Lt3. The second capacitor Ct2 is connected between the first inductor Lt1 and the first terminal 60a as a series circuit element. The third inductor Lt3 is connected, as a parallel circuit element, between a wire between the first inductor Lt1 and the second capacitor Ct2 and a wire between the second inductor Lt2 and the second terminal 60b. It can be said that this configuration is obtained by adding a high-pass filter having an asymmetrical circuit configuration to the preceding stage of the configuration of the matching circuit shown in FIG. 6. As compared with the configuration of FIG. 7A, it is possible to reduce the number of elements although the positive/negative symmetry of the circuit lowers. Also with such a configuration, it is possible to further improve the transmission efficiency.

Figure 7C:
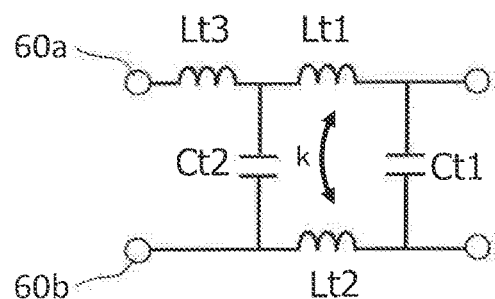
FIG. 7C is a diagram showing a third variation of a matching circuit.

FIG. 7C is a diagram showing a third variation of the matching circuit 80. The matching circuit 80 further includes the third inductor Lt3 and the second capacitor Ct2. The third inductor Lt3 is connected between the first inductor Lt1 and the first terminal 60a as a series circuit element. The second capacitor Ct2 is connected, as a parallel circuit element, between a wire between the first inductor Lt1 and the third inductor Lt3 and a wire between the second inductor Lt2 and the second terminal 60b. It can be said that this configuration is obtained by adding a low-pass filter having an asymmetrical circuit configuration to the preceding stage of the configuration of the matching circuit shown in FIG. 6. Also with such a configuration, it is possible to further improve the transmission efficiency.

Figure 7D:
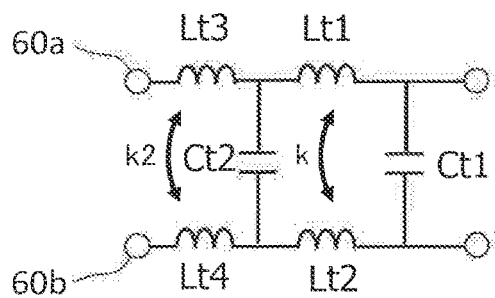
FIG. 7D is a diagram showing a fourth variation of a matching circuit.

FIG. 7D is a diagram showing a fourth variation of the matching circuit 80. The matching circuit 80 includes the third inductor Lt3, a fourth inductor Lt4 and the second capacitor Ct2. The third inductor Lt3 is to be connected between the first inductor Lt1 and the first terminal 60a. The fourth inductor Lt4 is connected between the second inductor Lt2 and the second terminal 60b as a series circuit element. The second capacitor Ct2 is connected, as a parallel circuit element, between a wire between the first inductor Lt1 and the third inductor Lt3 and a wire between the second inductor Lt2 and the fourth inductor Lt4. The third inductor Lt3 and the fourth inductor Lt4 may be designed so that they are coupled together with a negative coupling coefficient, for example. It can be said that this configuration is obtained by adding a low-pass filter having a symmetrical circuit configuration to the configuration shown in FIG. 6. With such a configuration, it is possible to further improve the transmission efficiency. Note that the configuration of FIG. 7D can be regarded as being a configuration in which the common mode choke resonator shown in FIG. 6 is used in a multiple-stage connection. The number of stages of the common mode choke resonator to be connected is not limited to two, but it may be three or more.

Figure 7E:
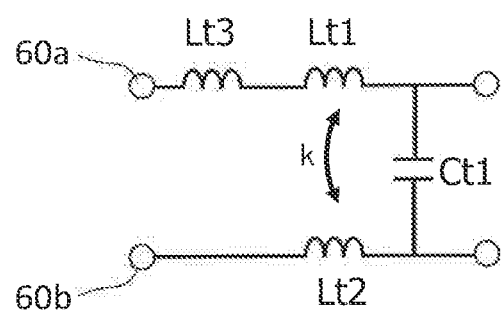
FIG. 7E is a diagram showing a fifth variation of a matching circuit.

FIG. 7E is a diagram showing a fifth variation of the matching circuit 80. The matching circuit 80 further includes the third inductor Lt3. The third inductor Lt3 is connected between the first inductor Lt1 and the first terminal 60a. It is possible to improve the transmission efficiency also with such a configuration, when for example an inductor that does not couple to the second inductor Lt2 is needed for matching in addition to the coupling between the first inductor Lt1 and the second inductor Lt2.

Figure 7F:
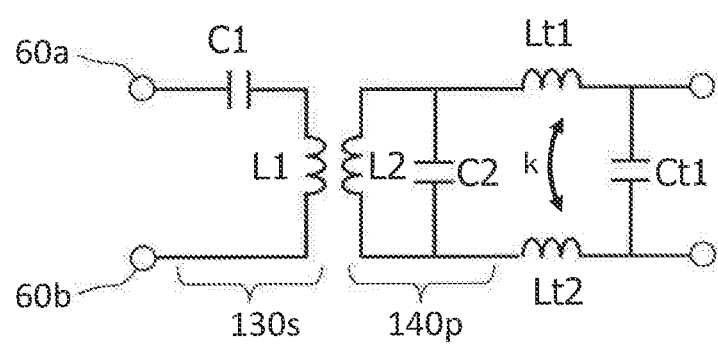
FIG. 7F is a diagram showing a sixth variation of a matching circuit.

FIG. 7F is a diagram showing a sixth variation of the matching circuit 80. The matching circuit 80 further includes the series resonance circuit 130s connected to the power conversion circuit, and the parallel resonance circuit 140p that magnetically couples to the series resonance circuit 130s. The parallel resonance circuit 140p is connected to the first inductor Lt1 and the second inductor Lt2. It can be said that this configuration is obtained by adding the resonance circuits 130s and 140p shown in FIG. 4 to the preceding stage of the configuration of the matching circuit shown in FIG. 6. With such a configuration, it is possible to further increase the transformation ratio and realize desirable characteristics.

Each of the matching circuits shown in FIGS. 6 to 7F can be used in a power transmitting device or in a power receiving device. When a matching circuit is used in a power transmitting device, the two terminals shown on the right side of the figure are connected respectively to two power transmitting electrodes, and the terminals 60a and 60b may be terminals of an inverter circuit, for example. When a matching circuit is used in a power receiving device, the two terminals shown on the right side of the figure are connected to two power receiving electrodes, and the terminals 60a and 60b may be terminals of a rectifier circuit, for example.

In the present specification, an electrode unit installed in the power transmitting device may be referred to as the "power transmitting electrode unit", and an electrode unit installed in the power receiving device may be referred to as the "power receiving electrode unit". When the electrode unit is installed in the power transmitting device, the first electrode and the second electrode are referred to as power transmitting electrodes. When the electrode unit is installed in the power receiving device, the first electrode and the second electrode are referred to as power receiving electrodes. When electric power is transferred, a pair of power transmitting electrodes oppose a pair of power receiving electrodes. Electric power is transferred from the pair of power transmitting electrodes to the pair of power receiving electrodes via electric field coupling therebetween.

In each of the power transmitting electrode unit and the power receiving electrode unit, one of the first electrode and the second electrode may be divided into two portions that extend in parallel to each other. In that case, the other one of the first electrode and the second electrode is arranged between the two portions. Voltages of the same phase are applied to the two portions. With such a configuration, it is possible to also realize the effect of suppressing the leak electric field over the boundary between the first electrode and the second electrode. In an example, the other one of the first and second electrodes extends in the same direction as the two portions. The width of the two portions may be set to a value that is close to half the width of the second electrode, for example. For example, the width of the two portions may be set to be 0.4 times or more and 0.6 times or less the width of the second electrode. Thus, with a configuration in which at least one of the first and second electrodes is divided into two portions, there are essentially three or more electrodes that contribute to power transmission. When referring to such a configuration, the three electrodes may be referred to as "a group of electrodes".

A power transmitting device according to another aspect of the present disclosure includes the electrode unit described above and the power conversion circuit. The power conversion circuit converts the electric power output from the power source into the AC power and outputs the converted power.

A power receiving device according to still another aspect of the present disclosure includes the electrode unit described above and the power conversion circuit. The power conversion circuit converts the AC power output from the matching circuit into the other form of electric power and outputs the converted power.

A wireless power transmission system according to still another aspect of the present disclosure includes the power transmitting device described above and the power receiving device described above.

The power receiving device may be installed on a vehicle, for example. The "vehicle" as used herein is not limited to a wheeled vehicle such as a transport robot set forth above, but refers to any movable object that is driven by electric power. The vehicle encompasses a powered vehicle that includes an electric motor and one or more wheels, for example. Such a vehicle can be an automated guided vehicle (AGV) such as a transport robot set forth above, an electric car (EV), an electric cart, or an electric wheelchair, for example. The "vehicle" as used herein also includes a movable object that does not include wheels. For example, the "vehicle" encompasses biped walking robots, unmanned aerial vehicles (UAVs, so-called "drones") such as multi-copters, manned electric aircrafts, and elevators.

Embodiments of the present disclosure will now be described in greater detail. Note however that unnecessarily detailed descriptions may be omitted. For example, detailed descriptions on what are well known in the art and redundant descriptions on substantially the same configurations may be omitted. This is to prevent the following description from becoming unnecessarily redundant, to make it easier for a person of ordinary skill in the art to understand. Note that the present inventors provide the accompanying drawings and the following description in order for a person of ordinary skill in the art to sufficiently understand the present disclosure, and they are not intended to limit the subject matter set forth in the claims. In the following description, identical or similar components are denoted by the same reference signs.

EMBODIMENTS

Figure 8:
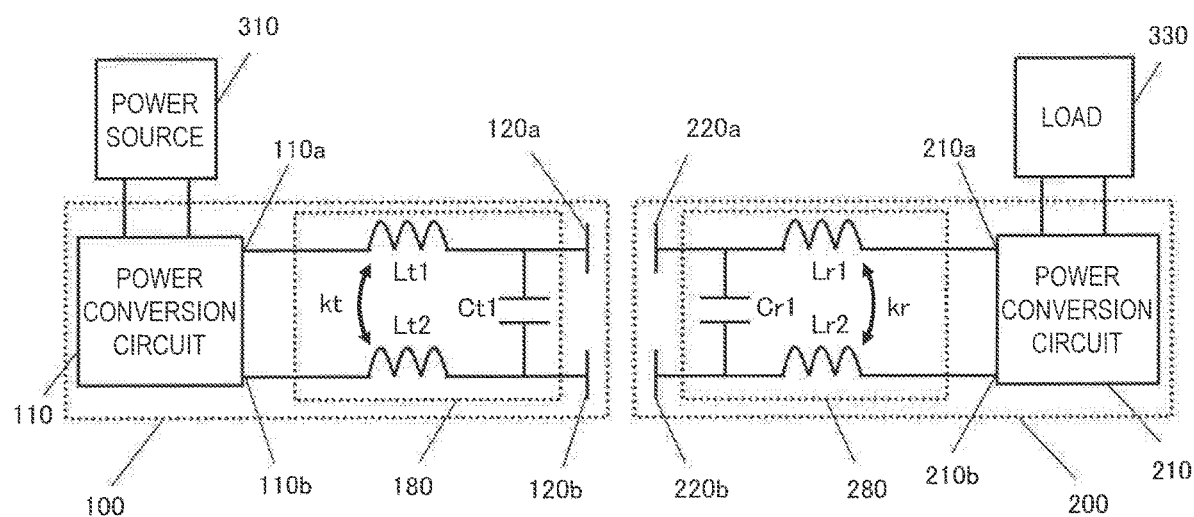
FIG. 8 is a diagram showing a configuration of a wireless power transmission system according to an exemplary embodiment of the present disclosure.

FIG. 8 is a diagram showing a configuration of a wireless power transmission system according an exemplary embodiment of the present disclosure. The wireless power transmission system of the present embodiment is used in an application of a power supply for the vehicle 10 described above with reference to FIG. 1 and FIG. 2.

The wireless power transmission system includes the power transmitting device 100 and the power receiving device 200. FIG. 8 also shows the power source 310 and the load 330, which are external elements to the present system. The power source 310 and the load 330 may be included in the wireless power transmission system.

The power transmitting device 100 includes the first power conversion circuit 110, a first matching circuit 180 and two power transmitting electrodes 120a and 120b. The first matching circuit 180 is connected between the first power conversion circuit 110 and two power transmitting electrodes 120a and 120b. The first matching circuit 180 has a similar configuration to the matching circuit 80 shown in FIG. 6. The first matching circuit 180 includes the inductors Lt1 and Lt2 and the capacitor Ct1. The inductor Lt1 is connected between one terminal 110a of the power conversion circuit 110 and one power transmitting electrode 120a. The inductor Lt2 is connected between the other terminal 110b of the power conversion circuit 110 and the other power transmitting electrode 120b. The capacitor Ct1 is connected between a wire between the inductor Lt1 and the power transmitting electrode 120a and a wire between the inductor Lt2 and the power transmitting electrode 120b.

The power receiving device 200 includes two power receiving electrodes 220a and 220b, a second matching circuit 280 and a second power conversion circuit 210. The second matching circuit 280 is connected between the two power receiving electrodes 220a and 220b and the second power conversion circuit 210. The second matching circuit 280 also has a similar configuration to the matching circuit 80 shown in FIG. 6. The second matching circuit 280 includes the inductors Lr1 and Lr2 and a capacitor Cr1. The inductor Lr1 is connected between one terminal 210a of the power conversion circuit 210 and one power receiving electrode 220a. The inductor Lr2 is connected between the other terminal 210b of the power conversion circuit 210 and the other power receiving electrode 220b. The capacitor Cr1 is connected between a wire between the inductor Lr1 and the power receiving electrode 220a and a wire between the inductor Lr2 and the power receiving electrode 220b.

The components will now be described in greater detail. In the following description, the power transmitting electrodes 120a and 120b may be referred to as "the power transmitting electrode 120" without distinguishing them from each other. Similarly, the power receiving electrodes 220a and 220b may be referred to as "the power receiving electrode 220" without distinguishing them from each other.

There is no particular limitation on the sizes of the housing of the vehicle 10, the power transmitting electrodes 120a and 120b and the power receiving electrodes 220a and 220b shown in FIG. 1, and they may be set to the following sizes, for example. The lengths (sizes in the Y direction shown in FIG. 1) of the power transmitting electrodes 120a and 120b may be set within a range of 50 cm to 20 m, for example. The widths (the size in the X direction shown in FIG. 1) of the power transmitting electrodes 120a and 120b may be set within a range of 0.5 cm to 1 m, for example. The size of the housing of the vehicle 10 in the direction of travel and that in the transverse direction may each be set within a range of 20 cm to 5 m, for example. The length (the size in the direction of travel) of each of the power receiving electrodes 220a and 220b may be set within a range of 5 cm to 2 m, for example. The width (the size in the transverse direction) of each of the power receiving electrodes 220a and 220b may be set within a range of 2 cm to 2 m, for example. The gap between the pair of power transmitting electrodes and the gap between the pair of power receiving electrodes may be set within a range of 1 mm to 40 cm, for example. The distance between the power transmitting electrodes 120a and 120b and the power receiving electrodes 220a and 220b may be about 5 mm to 30 mm, for example. Note however that there is no limitation to these numerical ranges.

The load 330 may include a driving electric motor, a capacitor or a secondary battery for storing electricity, for example. The load 330 is driven or charged by the DC power output from the power conversion circuit 210.

The electric motor may be any motor such as a DC motor, a permanent magnet synchronous motor, an induction motor, a stepper motor and a reluctance motor. The motor rotates the wheels of the vehicle 10 via shafts, gears, etc., to move the vehicle 10. Depending on the type of the motor, the power conversion circuit 210 may include various types of circuits such as a rectifier circuit, an inverter circuit and an inverter control circuit. In order to drive an AC motor, the power conversion circuit 210 may include a converter circuit for directly converting the frequency of the received energy (i.e., AC power) into the frequency for driving the motor.

The capacitor may be a high-capacity, low-resistance capacitor such as an electric double layer capacitor or a lithium ion capacitor, for example. By using such a capacitor as a condenser, it is possible to realize faster charging than when a secondary battery is used. A secondary battery such as a lithium ion battery may be used instead of a capacitor. In that case, more energy can be stored although charging will take longer. The vehicle 10 drives the motor using the electric power stored in a capacitor or a secondary battery to move around.

As the vehicle 10 moves, the amount of electric power stored in the capacitor or the secondary battery decreases. Therefore, recharging is needed to keep moving. In view of this, when the charging amount decreases below a predetermined threshold value while moving, the vehicle 10 moves close to the power transmitting device 100 for charging. The moving may be done under control of a central control device (not shown), or may be done by autonomous decision of the vehicle 10. The power transmitting device 100 may be installed at a plurality of locations in a factory.

The matching circuit 180 of the power transmitting device 100 matches the impedance of the power conversion circuit 110 and the impedance of the power transmitting electrodes 120a and 120b with each other. The inductor Lt1 and the inductor Lt2 may function as a common mode choke filter with a predetermined coupling coefficient. The inductance values of these inductors Lt1 and Lt2 are set to values that are substantially equal to each other.

Figure 9:
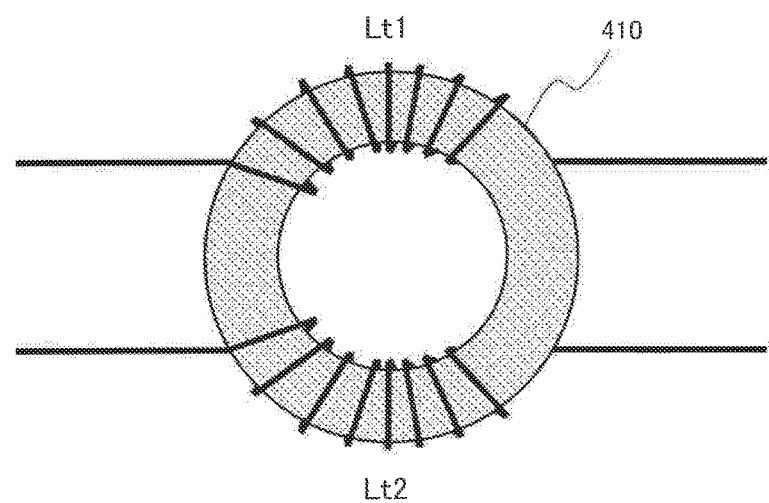
FIG. 9 is a diagram schematically showing a configuration example of two inductors.

FIG. 9 is a diagram schematically showing a configuration example of two inductors Lt1 and Lt2. In this example, the two inductors Lt1 and Lt2 are wound around a core 410, which is a ring-shaped or toroidal-shaped magnetic material. The core 410 may be a soft-magnetic ferrite core, for example. The inductors Lt1 and Lt2 are arranged in an orientation that realizes a negative coupling coefficient via the core 410. Specifically, $-1 < k < 0$ where k is the coupling coefficient of the inductors Lt1 and Lt2. As the coupling coefficient k is closer to $-1$, more desirable characteristics are realized in view of transmission efficiency. When currents of the same phase are input to the inductors Lt1 and Lt2 through the input/output terminals on the left side of FIG. 9, currents of the same phase will not be output to the output terminals on the right side of FIG. 9. With such a configuration, it is possible to reduce the probability that a common mode noise, which may be generated in the preceding stage of the circuit, is transferred to subsequent stages.

The inductors Lt1 and Lt2 do not always need to have a structure as shown in FIG. 9. Each of the inductors Lt1 and Lt2 may have a hollow structure in order to realize a low loss characteristic. Note that the coupling coefficient can be measured by a method defined in JIS C5321, for example.

The capacitor Ct1 may be designed so as to resonate between leakage inductances of the inductors Lt1 and Lt2. The resonance frequency of the common mode choke resonance circuit formed by the inductors Lt1 and Lt2 and the capacitor Ct1 may be designed to be a value that is equal to the frequency f1 of the AC power output from the power conversion circuit 110. This resonance frequency may be set to a value within a range of about 50% to 150% of the transmission frequency f1, for example. The power transmission frequency f1 may be set to 50 Hz to 300 GHz, for example, to 20 kHz to 10 GHz in an example, to 20 kHz to 20 MHz in another example, and to 80 kHz to 14 MHz in yet another example.

The inductors Lr1 and Lr2 and the capacitor Cr1 in the power receiving device 200 also have a similar configuration to the inductors Lt1 and Lt2 and the capacitor Ct1 in the power transmitting device 100.

Each of the inductors Lt1, Lt2, Lr1 and Lr2 may be a winding coil using a litz wire or a twisted wire formed of a material such as copper or aluminum, for example. A planar coil or a laminated coil formed on a circuit board may be used. Any type of a capacitor that has a chip shape or a lead shape, for example, may be used for the capacitors Ct1 and Cr1. Capacitance between two wires with air interposed therebetween may be used as the capacitors.

Figure 10:
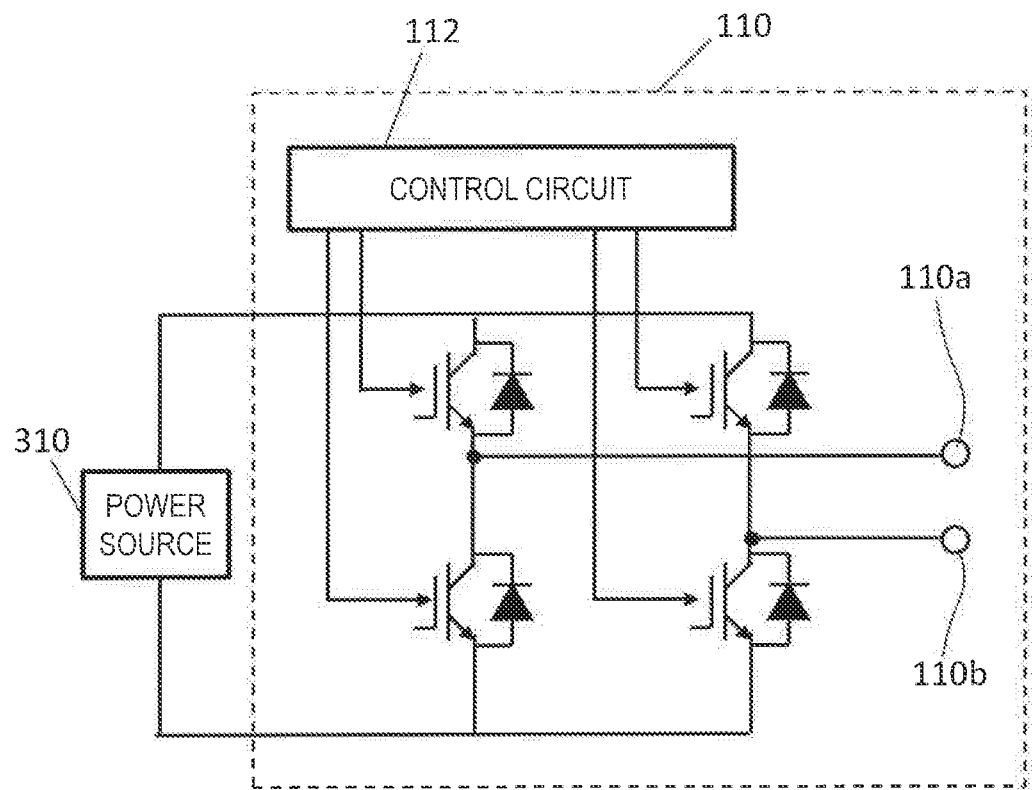
FIG. 10 is a diagram schematically showing a configuration example of a power conversion circuit of a power transmitting device.

FIG. 10 is a diagram schematically showing a configuration example of the power conversion circuit 110 in the power transmitting device 100. In this example, the power source 310 is a DC power source. The power conversion circuit 110 includes a full-bridge inverter circuit including four switching elements, and a control circuit 112. Each switching element may be implemented by a transistor such as an IGBT or a MOSFET, for example. The control circuit 112 includes a gate driver that outputs a control signal for controlling the conductive (ON) state and the non-conductive (OFF) state of the switching elements, and a processor that causes the gate driver to output the control signal. The processor may be a CPU in a microcontroller unit (MCU), for example. A half-bridge inverter circuit or another oscillator circuit such as a class E may be used instead of a full-bridge inverter circuit shown in FIG. 10.

The power conversion circuit 110 may include other elements such as a modulation/demodulation circuit for communication and various sensors for measuring the voltage, the current, etc. When the power conversion circuit 110 includes a modulation/demodulation circuit for communication, it is possible to transmit data to the power receiving device 200 while superimposing the data on AC power. When the power source 310 is an AC power source, the power conversion circuit 110 converts the input AC power into AC power for power transmission having a different frequency or voltage.

Figure 11:
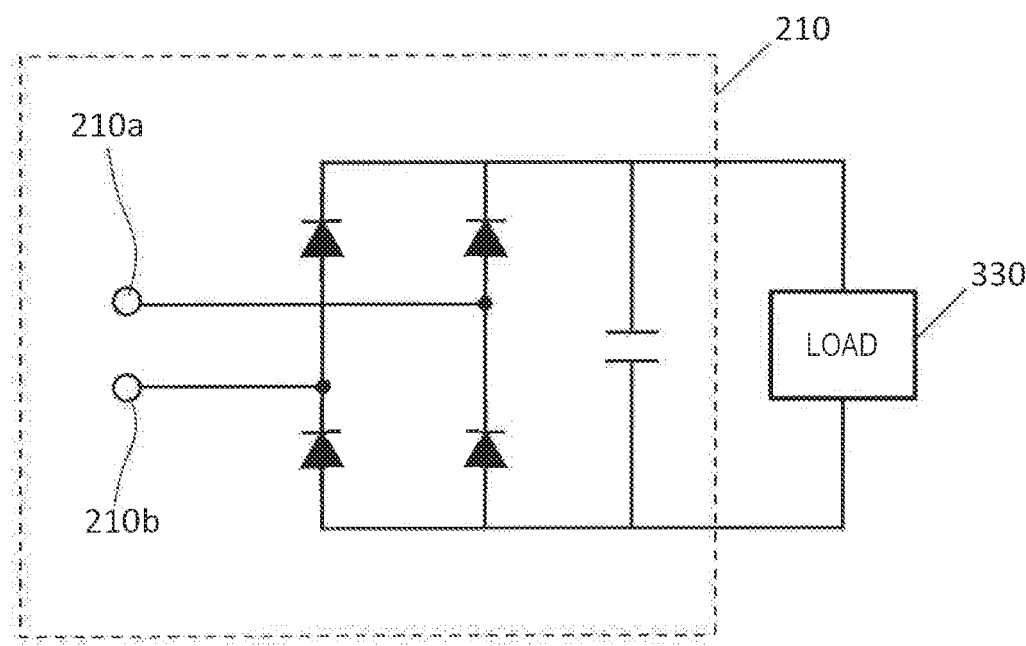
FIG. 11 is a diagram schematically showing a configuration example of a power conversion circuit of a power receiving device.

FIG. 11 is a diagram schematically showing a configuration example of the power conversion circuit 210 in the power receiving device 200. In this example, the power conversion circuit 210 is a full-wave rectifier circuit including a diode bridge and a smoothing capacitor. The power conversion circuit 210 may have another rectifier configuration. The power conversion circuit 210 may include various circuits such as a constant voltage/constant current control circuit and a modulation/demodulation circuit for communication, in addition to the power conversion circuit 210. The power conversion circuit 210 converts the received AC energy into DC energy that can be used by the load 330. Various sensors for measuring the voltage, the current, etc., may be included in the power conversion circuit 210. When the energy used by the load 330 is AC energy, the power conversion circuit 210 is configured so as to output AC energy rather than DC.

The power source 310 may be any power source such as a commercial power source, a primary battery, a secondary battery, a solar battery, a fuel battery, a USB (Universal Serial Bus) power source, a high-capacity capacitor (e.g., an electric double layer capacitor), a voltage converter connected to a commercial power source, for example. The power source 310 may be a DC power source or an AC power source.

Next, advantageous effects of the present embodiment will be described.

In the present embodiment, as opposed to the examples shown in FIG. 3 and FIG. 4, the matching circuits 180 and 280, which are required to have a high-ratio step-up/step-down characteristic, do not have a configuration in which a transformer is inserted in series. In the examples of FIG. 3 and FIG. 4, the inductance ratios L2/L1 and L3/L4 need to be set high in order to realize a high step-up ratio or step-down ratio. For example, in the example of FIG. 3, the inductance ratios L2/L1 and L3/L4 can be values as high as about several tens. Also in the example of FIG. 4, the inductance ratios L2/L1 and L3/L4 can be high values. It is difficult to improve the Q value of an inductor having a low inductance, and there is a limitation on improving the Q value of an inductor having a high inductance. The loss from the insertion of a transformer is also strongly dependent on the absolute value of the coupling coefficient between inductors forming the transformer. Therefore, a pair of inductors are required to be coupled together strongly. In these examples, it is difficult to realize a low-loss transformer using a combination of low-loss inductors. Moreover, using an inductor having a high inductance leads to a decrease in the self-resonance frequency, which likely leads to a leakage of harmonic noise.

In contrast, in the embodiment shown in FIG. 8, the inductances Lt1 and Lt2 are set to values that are substantially equal to each other, and the inductance Lr1 and Lr2 are also set to values that are substantially equal to each other. Inductors of generally equal inductances can easily be formed with generally equal sizes, e.g., inner diameters, and as a result, it is easy to enhance the coupling between the inductors. It also eliminates the restriction that a loss of one inductor results in a loss of the inductor pair as a whole. Thus, it is possible to easily realize a high-efficiency matching circuit using a combination of low-loss inductors.

Moreover, the present embodiment also realizes the effect of reducing noise. With the configuration where an inductor is inserted in series along a path that leads to each electrode, harmonic noise is suppressed. Particularly, when the coupling coefficient between the inductors Lt1 and Lt2 and the coupling coefficient between the inductors Lr1 and Lr2 are designed in the range of greater than −1 and less than −0, the noise suppressing effect becomes more pronounced.

The present inventor compared the transmission characteristic obtained when high-frequency power is transmitted between the configurations of FIG. 3 (Comparative Example 1), FIG. 4 (Comparative Example 2) and FIG. 8 (Example of the present disclosure). As a result, results shown in Table 1 were obtained.

TABLE 1

|  | FIG. 3 (Comparative Example 1) | FIG. 4 (Comparative Example 2) | FIG. 8 (Example of present disclosure) |
| --- | --- | --- | --- |
| Efficiency | 53.7% | 75.4% | 83.4% |
| Heat generation of power transmitting inductor | L1:132 L2:103 | L1:100 L2:76 | Lt1:60 Lt2:60 |
| Heat generation of power receiving inductor | L3:61 L4:69 | L3:51 L4:62 | Lr1:51 Lr2:51 |
| Sum of 3rd harmonic inductor current | L1:118 | L1:100 | Lt1:9.6 |

The results of Table 1 were obtained under the following conditions. An analysis was conducted with the coupling capacitances between the electrodes 120a-220a and the electrodes 120b-220b being 80 pF and the transmission frequency being 480 kHz. The input DC voltage is 200 V and the transfer electric power is 2 kW. The matching circuit of each example includes many inductor pairs. The analysis was conducted while limiting the absolute value of the coupling coefficient to 0.8 at maximum. The heat generation values were normalized with the amount of heat generation of the inductor L1 on the power transmitting side in Comparative Example 2 being 100. The third-harmonic inductor current values were normalized with the third-harmonic current flowing through the inductor L1 of Comparative Example 2 being 100. Table 1 shows the third-harmonic current of the inductor L1 for Comparative Example 1 and Comparative Example 2, and the third-harmonic current level of the inductor Lt1 for the example of the present disclosure.

As can be seen from Table 1, it was confirmed that in the example of the present disclosure, as compared with Comparative Examples 1 and 2, the transmission efficiency was improved, thereby suppressing the total heat generation of the inductors in the matching circuit, and reducing the sum of the third-harmonic current flowing through the inductors in the matching circuit.

Next, variations of the present embodiment will be described.

The matching circuits 180 and 280 are not limited to the configuration shown in FIG. 8, but many variations thereof are possible. Each of the matching circuits 180 and 280 may employ any of the various configurations as shown in FIG. 7A to FIG. 7F, for example.

Figure 12:
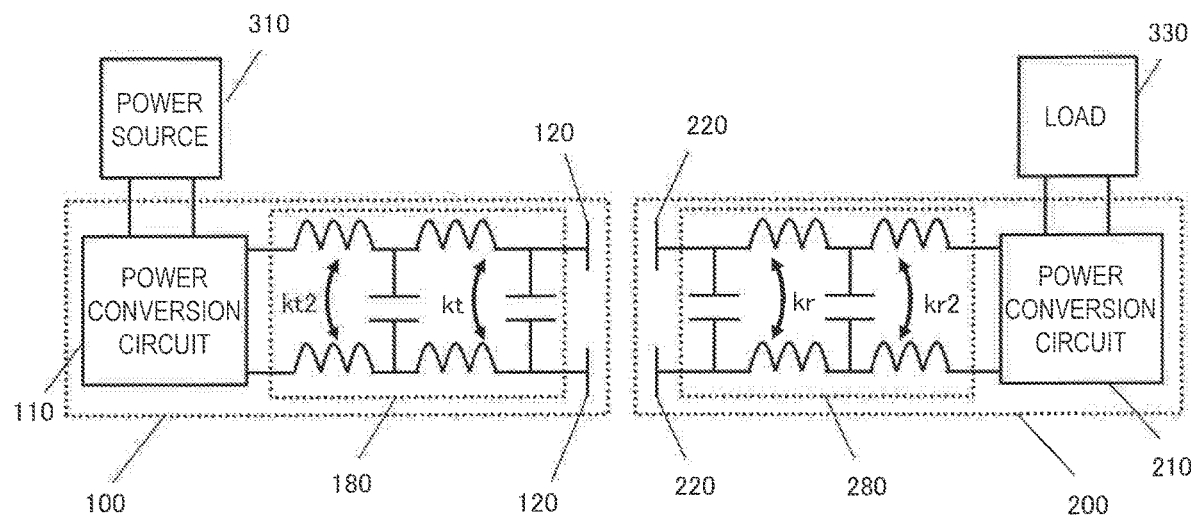
FIG. 12 is a diagram showing a first variation of a wireless power transmission system.

FIG. 12 shows an example where each of the matching circuits 180 and 280 has a configuration shown in FIG. 7D. As in this example, it is possible to further improve the transmission efficiency by connecting a combination of two inductors and a parallel capacitive element in multiple stages. It was confirmed that the transmission efficiency improves up to 89.2% under conditions similar to those for the simulation described above.

Figure 13:
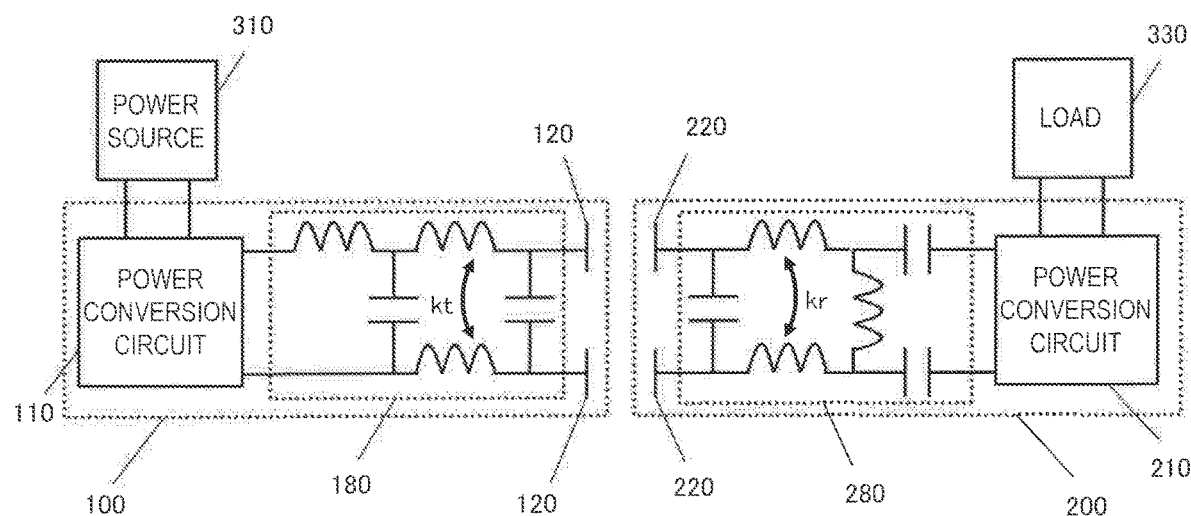
FIG. 13 is a diagram showing a second variation of a wireless power transmission system.
Figure 14:
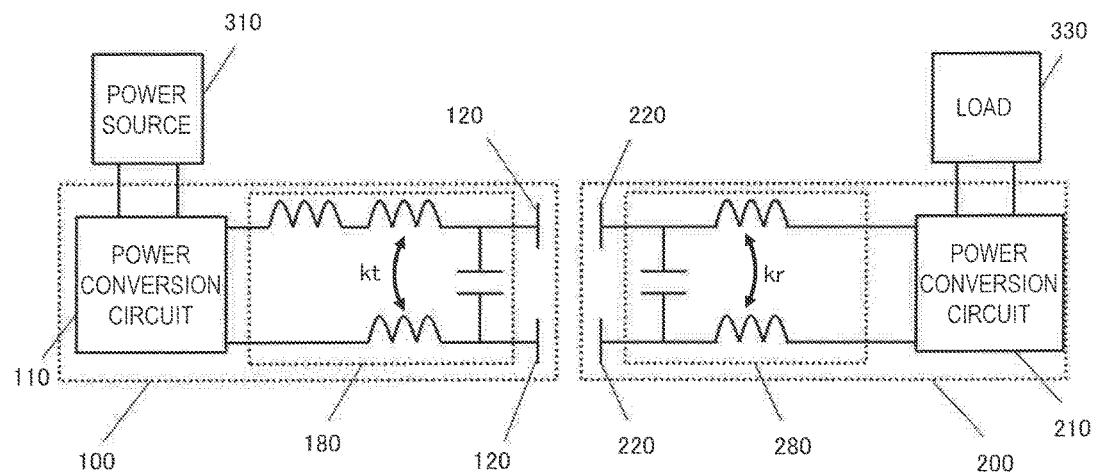
FIG. 14 is a diagram showing a third variation of a wireless power transmission system.

FIG. 13 shows an example where the matching circuit 180 has a configuration shown in FIG. 7C and the matching circuit 280 has a configuration shown in FIG. 7A. FIG. 14 shows an example where the matching circuit 180 has a configuration shown in FIG. 7E and the matching circuit 280 has a configuration similar to FIG. 8. As shown in these examples, the matching circuits 180 and 280 do not need to have similar circuit configurations.

Figure 15:
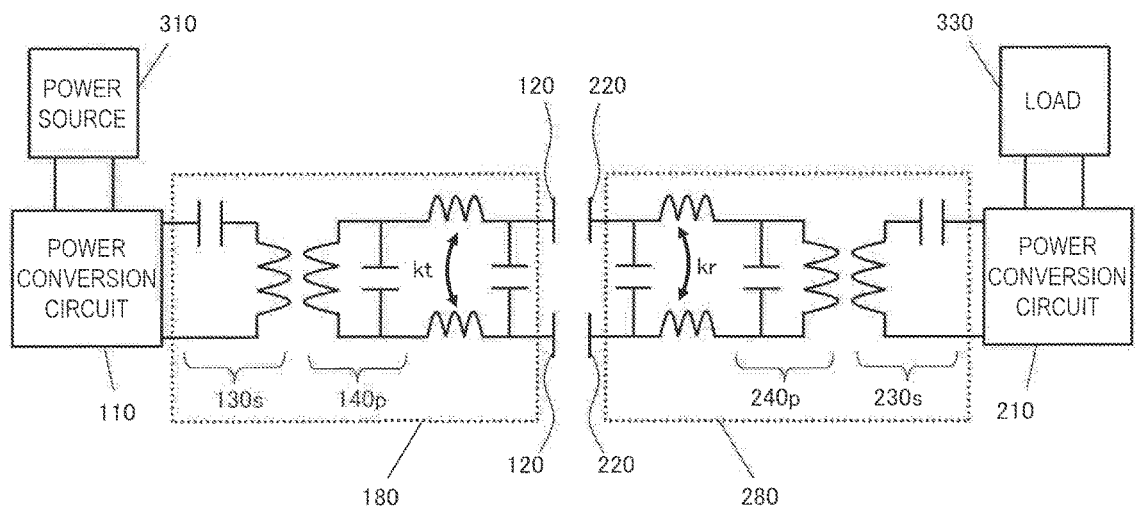
FIG. 15 is a diagram showing a fourth variation of a wireless power transmission system.

FIG. 15 shows an example where each of the matching circuits 180 and 280 has a configuration shown in FIG. 7F. The matching circuit 180 on the power transmitting side includes the series resonance circuit 130s and the parallel resonance circuit 140p between the power conversion circuit 110 and the common mode choke resonator. The matching circuit 280 on the power receiving side includes the series resonance circuit 230s and the parallel resonance circuit 240p between the power conversion circuit 210 and the common mode choke resonator. By using transformers as described above, it becomes easy to increase the step-up ratio of the matching circuit 180 and the step-down ratio of the matching circuit 280. If the power conversion circuit 110 (e.g., a frequency conversion circuit) can be driven by a power source of a lower voltage, there is no need for an expensive power semiconductor and it is possible to reduce the cost of the device. Even when there is a limitation on the coupling capacitance in the coupling electrode section (i.e., the electrodes 120 and 220), it is possible to send a large amount of electric power with small-size electrodes.

The electrodes of the embodiment described above have a structure where they extend parallel to each other in the same direction, but the structure does not need to be such a structure depending on the application. For example, the electrodes may have a rectangular shape such as a square shape. The technique of the present disclosure can be applied to any embodiment in which a plurality of electrodes having such a rectangular shape are arranged in one direction. Moreover, it is not an essential requirement that the surfaces of all the electrodes are on the same plane. Moreover, the surfaces of the electrodes do not need to have a completely planar shape, but may have a curved surface or a shape with protrusions/depressions, for example. Such a surface is also referred to as a "planar surface" as long as it is generally planar. The electrodes may be inclined with respect to the road surface.

The wireless power transmission system according to an embodiment of the present disclosure may be used as a system for transporting articles inside a factory, as described above. The vehicle 10 functions as a platform track that has a platform where articles are placed and autonomously moves around inside the factory to carry the articles to intended locations. However, the wireless power transmission system and the vehicle of the present disclosure are not limited to such an application, but may be used in various other applications. For example, the vehicle is not limited to an AGV, but may be another industrial machine, a service robot, an electric car, a forklift, a multicopter (drone), an elevator, or the like. For example, the wireless power transmission system can be used not only in a factory, but also in a shop, in a hospital, in a house, on a road, on a runway, and in any other place.

INDUSTRIAL APPLICABILITY

The technique of the present disclosure can be used for any device that is driven by electric power. For example, it can be used for a vehicle such as an electric car (EV), an automated guided vehicle (AGV) used in a factory, a forklift, an unmanned aircraft (UAV), or an elevator.

REFERENCE SIGNS LIST

10 Vehicle
20a, 20b Electrode
30 Floor surface
40a, 40b Wire
50 Electrode unit
60 Power conversion circuit
60a, 60b Terminal
80 Matching circuit
100 Power transmitting device
110 Power conversion circuit
120 Power transmitting electrode
130 First parallel resonance circuit
130s Power transmitting-side series resonance circuit
140 Second parallel resonance circuit
140p Power transmitting-side parallel resonance circuit
180 Matching circuit
200 Power receiving device
210 Power conversion circuit
220 Power receiving electrode
230 Third parallel resonance circuit
230p Power receiving-side parallel resonance circuit
240 Fourth parallel resonance circuit
240s Power receiving-side series resonance circuit
280 Matching circuit
310 Power source
330 Load

The invention claimed is:

1. An electrode unit used in a power transmitting device or a power receiving device in a wireless power transmission system of an electric field coupling method, the electrode unit comprising:
   a first electrode and a second electrode, which are a power transmitting electrode pair or a power receiving electrode pair; and
   a matching circuit to be connected between a power conversion circuit and the first and second electrodes in the power transmitting device or the power receiving device, wherein:
   the power conversion circuit includes a first terminal and a second terminal, and converts electric power output from a power source into AC power for transmission and outputs the converted power from the first and second terminals, or converts AC power input to the first and second terminals into another form of electric power to be used by a load and outputs the converted power;

the matching circuit includes:

a first inductor connected to the first electrode;

a second inductor connected to the second electrode; and a first capacitor connected between a wire between the first electrode and the first inductor and a wire between the second electrode and the second inductor;

on an opposite side from the first electrode, the first inductor is to be directly or indirectly connected to the first terminal of the power conversion circuit;

on an opposite side from the second electrode, the second inductor is to be directly or indirectly connected to the second terminal of the power conversion circuit; and a coupling coefficient k between the first inductor and the second inductor satisfies $-1<k<0$.

2. The electrode unit according to claim 1, wherein where f1 denotes a frequency of the AC power, Lt1 denotes an inductance value of the first inductor, Lt2 denotes an inductance value of the second inductor, and Ct1 denotes a capacitance value of the first capacitor, the frequency f1 is set to a value within a range of 0.5 times to 1.5 times $1/(2\pi((Lt1+Lt2)Ct1)^{1/2})$.

3. The electrode unit according to claim 1, wherein Lt1 denotes an inductance value of the first inductor and Lt2 denotes an inductance value of the second inductor, a difference between Lt1 and Lt2 is smaller than 0.4 times an average value of Lt1 and Lt2.

4. The electrode unit according to claim 1, wherein when electric power is transferred, where V0 denotes an effective value of a voltage of the AC power output from the power conversion circuit or the AC power input to the power conversion circuit and V1 denotes an effective value of a voltage between the first electrode and the second electrode, $2.14<V1/V0<50$ is satisfied.

5. The electrode unit according to claim 4, wherein the matching circuit further includes:

a second capacitor to be connected between the first inductor and the first terminal; and a third inductor connected between a wire between the first inductor and the second capacitor and a wire between the second inductor and the second terminal.

6. The electrode unit according to claim 4, wherein the matching circuit further includes:

a second capacitor to be connected between the first inductor and the first terminal;

a third capacitor to be connected between the second inductor and the second terminal; and a third inductor connected between a wire between the first inductor and the second capacitor and a wire between the second inductor and the third capacitor.

7. The electrode unit according to claim 4, wherein the matching circuit further includes a third inductor to be connected between the first inductor and the first terminal.

8. The electrode unit according to claim 7, wherein the matching circuit further includes a second capacitor connected between a wire between the first inductor and the third inductor and a wire between the second inductor and the second terminal.

9. The electrode unit according to claim 7, wherein the matching circuit further includes:

a fourth inductor to be connected between the second inductor and the second terminal; and a second capacitor connected between a wire between the first inductor and the third inductor and a wire between the second inductor and the fourth inductor.

10. The electrode unit according to claim 1, wherein the matching circuit includes:

a series resonance circuit to be connected to the power conversion circuit; and a parallel resonance circuit that is connected to the first and second inductors and magnetically couples to the series resonance circuit.

11. A power transmitting device, comprising:

the electrode unit according to claim 1; and the power conversion circuit, wherein the power conversion circuit converts electric power output from the power source into the AC power and outputs the converted power.

12. A power receiving device, comprising:

the electrode unit according to claim 1; and the power conversion circuit, wherein the power conversion circuit converts the AC power output from the matching circuit into the other form of electric power and outputs the converted power.

13. A wireless power transmission system, comprising:

the power transmitting device according to claim 11; and a power receiving device comprising another of the electrode unit and another of the power conversion device.

* * * * *